(12) United States Patent
Somple et al.

(10) Patent No.: US 7,985,363 B2
(45) Date of Patent: Jul. 26, 2011

(54) METHOD OF ENCASING A MAGNET

(75) Inventors: Jessica Kate Somple, Manchester, VT (US); Randolph W. Pell, Marlboro, VT (US); Wayne Hilliard, Shaftsbury, VT (US)

(73) Assignee: Mack Molding Company, Arlington, VT (US)

(*) Notice: Subject to any disclaimer, the term of this patent is extended or adjusted under 35 U.S.C. 154(b) by 308 days.

(21) Appl. No.: 12/029,920

(22) Filed: Feb. 12, 2008

(65) Prior Publication Data
US 2009/0201112 A1 Aug. 13, 2009

(51) Int. Cl.
*B29C 45/14* (2006.01)

(52) U.S. Cl. ........ 264/263; 264/273; 264/274; 264/275; 264/279.1

(58) Field of Classification Search ................ None
See application file for complete search history.

(56) References Cited

U.S. PATENT DOCUMENTS

| | | | | |
|---|---|---|---|---|
| 2,844,363 A * | 7/1958 | Clark | ................ | 416/3 |
| 2,972,784 A * | 2/1961 | Shonka et al. | ................ | 264/112 |
| 3,149,403 A * | 9/1964 | Aurich et al. | ................ | 492/8 |
| 3,615,993 A * | 10/1971 | French | ................ | 156/155 |
| 4,289,722 A * | 9/1981 | Tranbarger | ................ | 264/102 |
| 4,303,062 A * | 12/1981 | Vars | ................ | 600/12 |
| 4,640,808 A * | 2/1987 | Okumura et al. | ................ | 264/46.5 |
| 4,647,891 A * | 3/1987 | Hughes | ................ | 335/302 |
| 4,810,987 A * | 3/1989 | Liebthal et al. | ................ | 335/302 |
| 4,910,861 A * | 3/1990 | Dohogne | ................ | 29/598 |
| 5,337,033 A * | 8/1994 | Kinouchi et al. | ................ | 335/302 |
| 5,459,359 A * | 10/1995 | Umehara | ................ | 310/13 |
| 5,711,912 A * | 1/1998 | Chatterjee et al. | ................ | 264/428 |
| 5,894,006 A * | 4/1999 | Herbst | ................ | 264/132 |
| 6,007,312 A * | 12/1999 | Pieters et al. | ................ | 417/420 |
| 6,299,450 B1 * | 10/2001 | Honkura et al. | ................ | 433/189 |
| 6,380,833 B1 * | 4/2002 | Nguyen et al. | ................ | 335/301 |
| 6,735,054 B2 * | 5/2004 | Ooi et al. | ................ | 360/264.9 |
| 6,765,319 B1 * | 7/2004 | Thompson | ................ | 310/43 |
| 7,391,291 B2 * | 6/2008 | Miyata | ................ | 335/302 |

* cited by examiner

*Primary Examiner* — Edmund H. Lee
(74) *Attorney, Agent, or Firm* — Heslin Rothenberg Farley & Mesiti P.C.

(57) ABSTRACT

A method of encasing a magnet to isolate the magnet from the environment is provided. The method includes introducing a magnet to a housing having at least one passage capable of passing a fluid from the environment to the magnet, introducing a hardenable fluid, for example, a resin, to the passage to obstruct the passage, and solidifying the hardenable fluid in the passage to provide a solid obstruction to the passage to isolate the magnet from environmental fluids. The housing may be provided as two mating housings and the passage may be provided by the mating surfaces between the two housings. An encased magnet is also disclosed. The encased magnet may be used in any environment that may be damaging to the magnet, for example, in surgical or prosthetic applications.

22 Claims, 8 Drawing Sheets

METHOD OF ENCASING A MAGNET

BACKGROUND OF THE INVENTION

1. Technical Field

This invention relates, generally, to methods of encasing magnets and magnets so encased. More particularly, the present invention provides improved encased magnets that can be used in environments that would otherwise damage the magnet or adversely affect the environment in which the magnet is used, such as, in prosthetic devices.

2. Description of Related Art

Magnets are often useful in a broad range of applications for retaining, typically, temporally, articles, or components on ferromagnetic surfaces. However, sometimes the environment or application in which a magnet is used can be damaging to the magnet or the magnet may be damaging to the environment. For example, in surgical environments, bodily fluids can be corrosive to certain magnetic materials, or magnetic material may be harmful to the patient, for instance, broken pieces of fragile magnets can be harmful to a patient. Therefore, it is often necessary to isolate the magnet from the environment, for example, by encasing the magnet to prevent contact with the environment.

Existing methods of encasing magnets can be effective, but aspects of the present invention provide methods and devices that facilitate encasement. For example, some prior art methods have proven to provide effective isolation of magnets from the environment by encasing a magnet in a housing and sealing the housing with an adhesive or with ultrasonic welding. However, aspects of the present invention provide a process of encasing a magnet that is easier, faster, and cheaper than existing methods.

Aspects of the present invention overcome these disadvantages and shortcomings of the prior art methods and devices and provide a method of encasing magnets and encased magnets that can be used in a broad range of applications.

SUMMARY OF THE INVENTION

The present invention in its many aspects provides methods for encasing magnets and magnets that are so encased. One aspect is a method of an encasing a magnet to substantially isolate the magnet from a surrounding environment, the method having the steps: inserting the magnet into a cavity in a housing, the housing comprising at least one passage capable of passing a fluid from the environment to the magnet; introducing a hardenable fluid, for example, a resin or an epoxy, to the at least one passage to obstruct the at least one passage; and solidifying the hardenable fluid in at least a portion of the at least one passage to provide a solid obstruction to the at least one passage to substantially isolate the magnet from substantially all environmental fluids. In one aspect, the introducing the hardenable fluid to the at least one passage may include inserting the housing into a mold having a void wherein the at least one passage is in fluid communication with the void; and introducing the hardenable fluid to the void wherein the fluid obstructs the at least one passage.

Another aspect of the invention is an encased magnet assembly including a housing having an internal cavity adapted to receive a magnet and at least one passage capable of passing a fluid from the environment to the cavity; and a solidified fluid, again, for example, a resin or an epoxy, positioned in at least a portion of the at least one passage to provide a solid obstruction to the at least one passage to substantially isolate the magnet from an environment surrounding the encased magnet assembly. In one aspect the housing may be made form a first housing and a second housing and the at least one passage comprises a passage formed by mating surfaces of the first housing and the second housing. In another aspect, the housing may be made from a first material, and the solidified fluid may be a second material bondable to the first material, for example, the first material may be the same as the second material, such as, a synthetic resin.

A further aspect of the invention is a method of an encasing a magnet to substantially isolate the magnet from a surrounding environment, the method including inserting the magnet into a cavity in a housing comprising an upper housing, a lower housing, and at least one passage, the at least one passage capable of passing a fluid from outside the housing to the cavity; inserting the housing into a mold; injecting a flowable resin into the mold to obstruct the at least one passage with flowable resin; and promoting the solidification of the flowable resin in at least a portion of the at least one passage to provide a solid obstruction to the at least one passage and substantially isolate the magnet from any fluids from outside the housing. In one aspect, the passage may be formed by mating surfaces of the upper housing and lower housing. In another aspect, the method provides a substantially fluid-tight seal between the magnet and the environment about the magnet.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION

Figure 1:
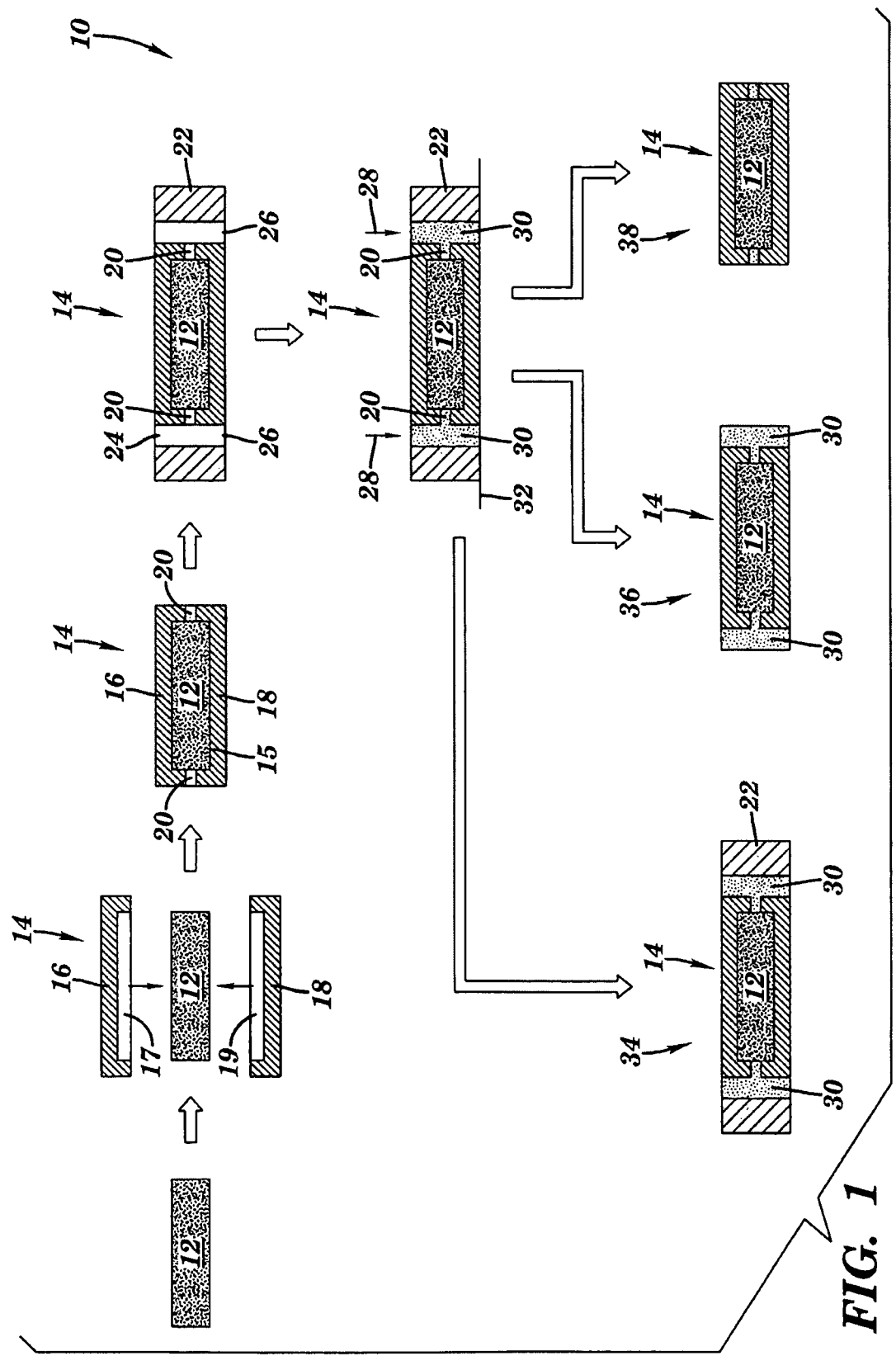
FIG. 1 is a schematic illustration of a method of encasing a magnet according to one aspect of the invention.

FIG. 1 is a schematic illustration of a method 10 for encasing a magnet 12 according to one aspect of the invention. Though magnet 12 shown in FIG. 1 is illustrated schematically as a rectangular block, it will be understood that magnet 12 may have any three-dimensional shape, including a cylinder, a disk, a plate, a sheet, and a parallelepiped, among other three dimensional shapes. Magnet 12 may comprise any type of conventional ferromagnetic material, both metallic and non-metallic, for example, magnet 12 may be a ferrite magnet, an aluminum-nickel-cobalt (Al—Ni—Co) magnet, or a rare-earth magnet, among other magnetic materials. In one aspect, magnet 12 may be a rare-earth magnet, for example, a samarium cobalt (SmCo) magnet, SmCo and iron magnet, a neodymium magnet, or a neodymium-iron-boron (NdFeB) magnet, among other magnetic materials.

As shown in FIG. 1, according to an aspect of the invention, magnet 12 may be inserted into a housing 14 having a cavity 15, for example, a housing 14 having a first or upper subassembly 16 having a partial cavity 17 and a second or lower subassembly 18 having a partial cavity 19 that, when assembled, provide the cavity 15. Upper subassembly 16 and lower subassembly 18 may comprise components of a multiple component housing, for example, a housing having three or more subassemblies or components adapted to be assembled to form a housing 14. Though housing 14 shown in FIG. 1 comprises a plurality of subassemblies or components 16 and 18, in one aspect of the invention, housing 14 may comprise a single assembly or component adapted to receive magnet 12.

As is understood in the art, since magnet 12 is somehow inserted into housing 14 or housing 14 is assembled from multiple components 16, 18, when assembled, housing 14 typically may have at least one passage capable of permitting the entry of a fluid, for example, a liquid or a gas, from the environment outside housing 14 to magnet 12. Though one or more passages from the outside of housing 14 to magnet 12 may typically be provided, for example, the gaps between mating surfaces of subassemblies 16 and 18 or any opening in housing 14 adapted to permit insertion of magnet 12, in FIG. 1, the one or more passages are collectively represented by the at least one passage 20, that is, representative laterally or radially directed passages 20 in housing 14.

According to one aspect of the invention, in order to isolate the environment about magnet 12 from magnet 12, passages 20 are filled with a material, specifically, a hardenable fluid, for example, an epoxy or a resin. The hardenable fluid may be introduced to passages 20 to obstruct the passages and then the hardenable material is allowed to harden or solidify in at least a portion of the passage 20 to provide a solid obstruction in passage 20 to substantially isolate magnet 12 from any environmental fluids, for example, air, water, or bodily fluids, among other fluids.

As shown in FIG. 1, in one aspect, the introduction and solidification of the hardenable fluid may be practiced with the aid of a mold 22 having a void or cavity 24 adapted to receive housing 14 containing magnet 12. As shown in FIG. 1, in one aspect, cavity 24 in mold 22 may be sized wherein, when housing 14 is inserted into cavity 24, at least one void or passage 26 is provided that is in fluid communication with the at least one passage 20 in housing 14. The housing 14 and mold 22 may be circular cylindrical in shape whereby voids 26 comprise annular voids between the outside diameter of housing 14 and the inside diameter of mold 22. According to one aspect, the hardenable fluid may be introduced to passages 26, as indicated by arrows 28 in FIG. 1, whereby at least some hardenable fluid is introduced to passages 20 in housing 14. As a result, when the hardenable fluid solidifies, at least some solidified fluid, indicated by shaded material 30 in voids 26 and in passage 20 in FIG. 1, provides at least some obstruction to passages 20 to isolate magnet 12 from the environment.

As shown in FIG. 1, mold 22 may be provided with at least some means for retaining the hardenable material in mold 22. For example, an open bottom of mold 22 may be placed against a surface 32 or mold 22 may include a bottom portion (not shown) adapted to retain the hardenable fluid in mold 22, for example, when subject to the force of gravity. In another aspect of the invention, mold 22 may include a top portion (not shown) adapted to retain the hardenable material from escaping from the open top of mold 22.

After solidification or hardening of the hardenable fluid and isolation of magnet 12 from its environment, an encased magnet assembly 34 having mold 22 as shown in FIG. 1 may be provided. In another aspect, mold 22 may be removed to expose the solidified fluid 30, to provide an encased magnet assembly 36 shown in FIG. 1. In one aspect, the solidified fluid 30 may be removed, for example, by machining, to provide the encased magnet assembly 38 shown in FIG. 1.

According to aspects of the invention, many different shaped magnets 12, housings 14, and molds 22 may be used to provide aspects of the invention. FIGS. 2 through 11 provide details of several shapes of magnets, housings, and molds that may be used to provide aspects of the invention.

Figure 2:
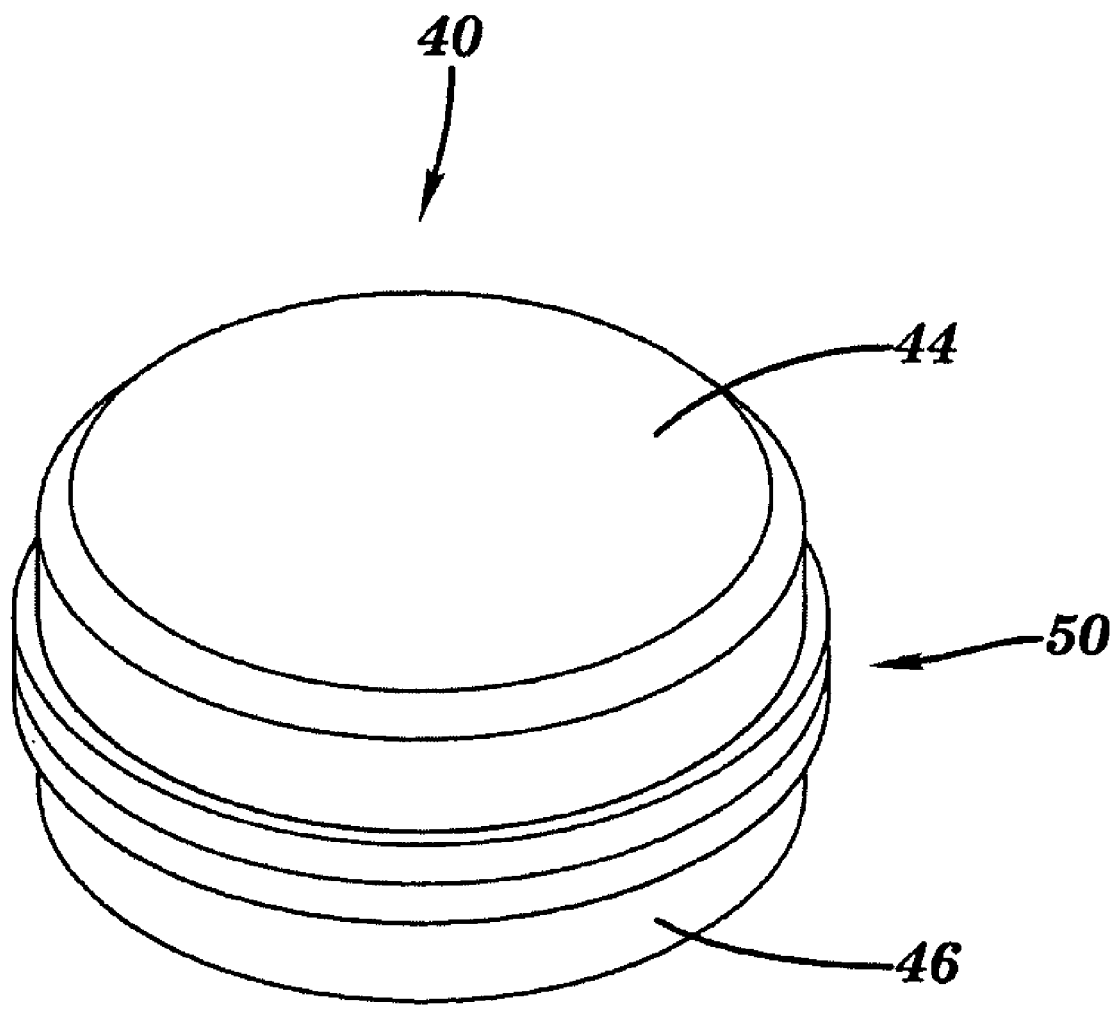
FIG. 2 is a perspective view of encasing housing according to one aspect of the invention.
Figure 3:
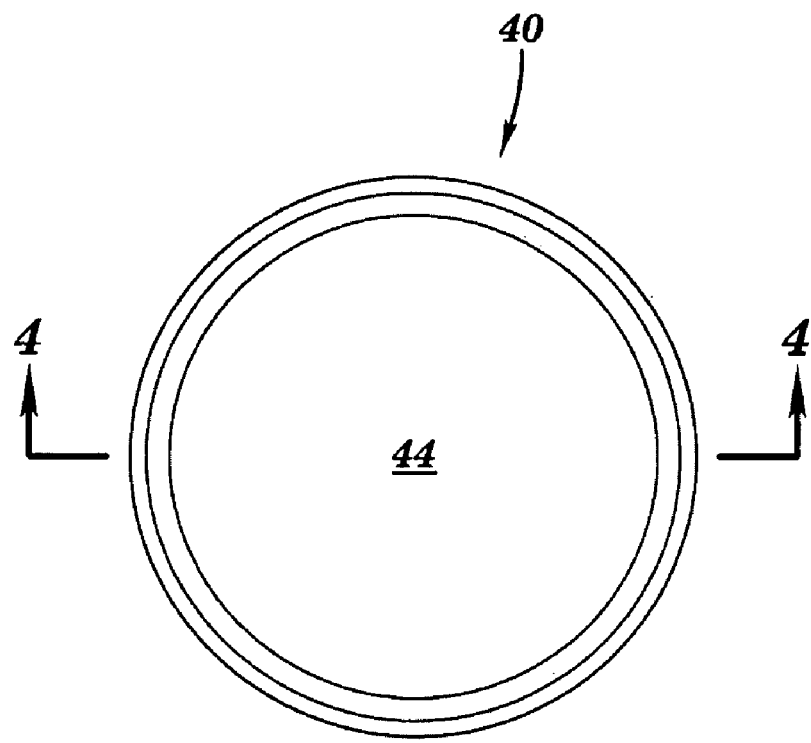
FIG. 3 is a top plan view of the encasing housing shown in FIG. 2.
Figure 4:
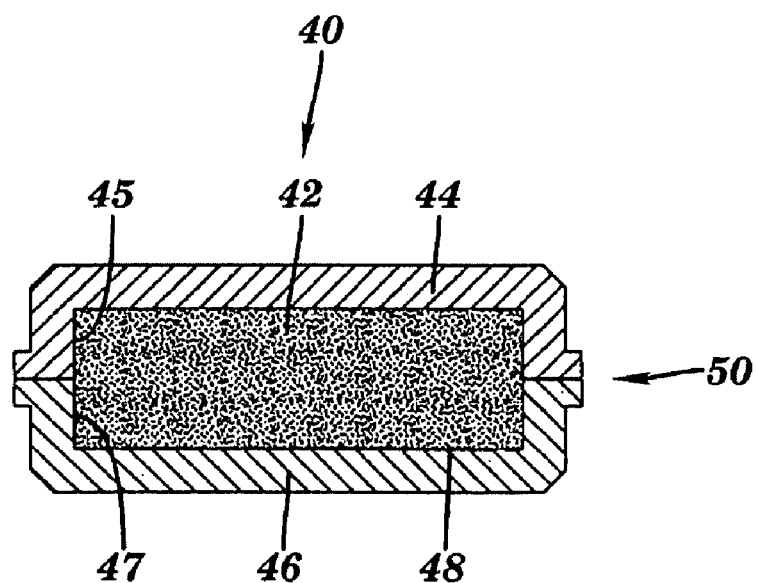
FIG. 4 is a cross-sectional view of the encasing housing shown in FIGS. 2 and 3 viewed along the section lines 4-4 in FIG. 3

FIG. 2 is a perspective view of encasing housing 40 according to one aspect of the invention. Housing 40 is adapted to encase a magnet (not shown). Housing 40 may correspond to housing 14 shown in FIG. 1. FIG. 3 is a top plan view of housing 40 shown in FIG. 2 and FIG. 4 is a cross-sectional view of housing 40 shown in FIGS. 2 and 3 as viewed along the section lines 4-4 in FIG. 3 and illustrating a typical magnet 42 encased by housing 40. Magnet 42 may have all the attributes, properties, and shapes of magnet 12 shown and described with respect to FIG. 1.

As shown most clearly in FIGS. 3 and 4, housing 40 and magnet 42 may be circular cylindrical in the aspect of the invention shown, though housing 40 and magnet 42 may comprise a multitude of shapes, including square, rectangular, oval, and triangular, among other shapes. Housing 40 may be provided as a first or upper subassembly 44 which may include a partial cavity 45 and a second or lower subassembly 46 which may include a partial cavity 47 that, when assembled, provide a cavity 48 adapted to receive magnet 42. In one aspect, subassembly 44 or 46 may not include a partial cavity, for example, at least one of subassemblies 44 and 46 may comprise a substantially planar cap that forms cavity 48 when mounted to its complementary subassembly having a cavity or recess. Upper subassembly 44 and lower subassembly 46 may comprise components of a multiple component housing, for example, a housing having three or more subassemblies or components adapted to be assembled to form a housing 40.

As discussed above with respect to FIG. 1, since magnet 42 is somehow inserted into housing 40 or housing 40 is assembled from multiple components 44, 46, when assembled, housing 40 typically may have at least one passage capable of permitting the passage of a fluid, for example, a liquid or a ages, from the environment outside housing 40 to magnet 42. In the aspect shown in FIGS. 2-4, the assembly of subassemblies 44 and 46 provides an annular passage 50 between the mating surfaces of subassemblies 44 and 46. As will be discussed below, according to aspects of the invention, annular passage 50 is obstructed to isolate magnet 42 from the surrounding environment.

Figure 5:
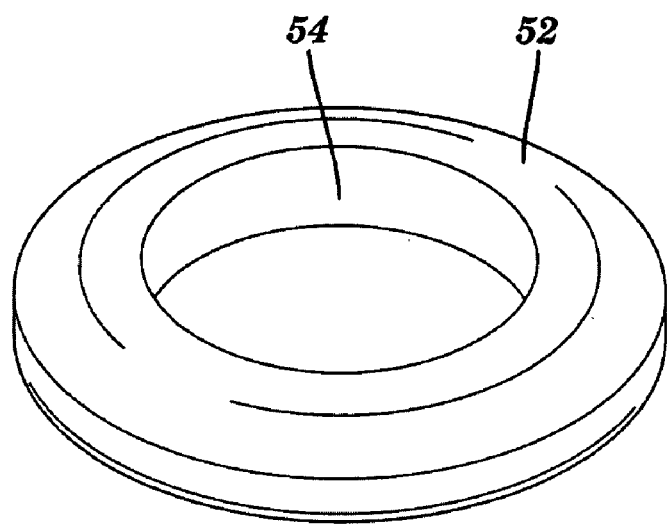
FIG. 5 is a perspective view of a molding housing according to one aspect of the invention.
Figure 6:
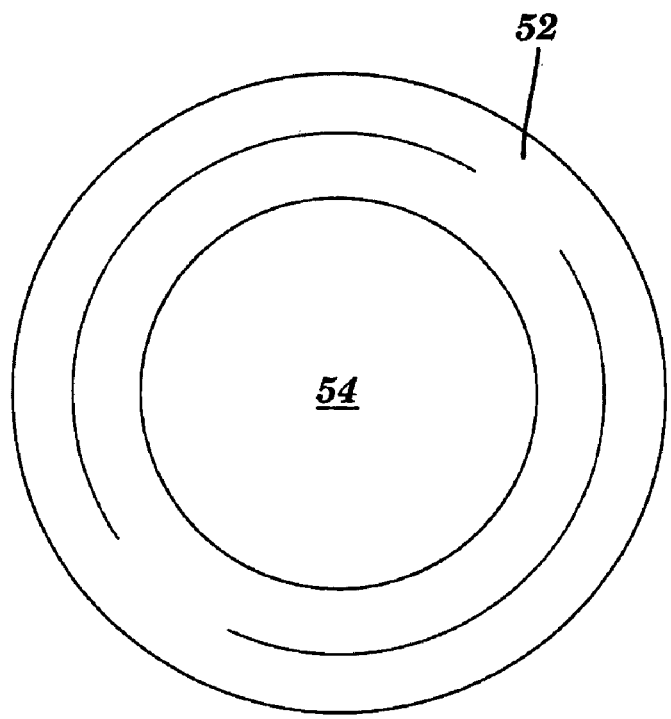
FIG. 6 is a top plan view of the molding housing shown in FIG. 5.

According to one aspect of the invention, in order to isolate the environment about magnet 42 from magnet 42, passage 50 is obstructed with a hardenable fluid, for example, an epoxy or resin, and then allowed to solidify or harden. As discussed above with respect to FIG. 1, one way of introducing and solidifying the hardenable fluid is with the use of mold housing. FIG. 5 is a perspective view of a mold housing 52 according to another aspect of the invention. Mold housing 52 may correspond to mold 22 shown in FIG. 1. FIG. 6 is a top plan view of mold housing 52 shown in FIG. 5. As shown in FIGS. 5 and 6, mold housing 52 may be annular in shape and have an cavity 54 adapted to receive a magnet encasing housing, such as, encasing housing 40 described above. In one aspect, mold housing 52 may take any convenient shape, for example, circular or rectangular cylindrical, while providing a cavity 54. Cavity 54 may also take any convenient shape, for example, circular, square, rectangular, polygonal, or irregular shape, for instance, depending upon the shape of the magnet encasing housing, for example, circular or rectangular cylindrical.

Figure 7:
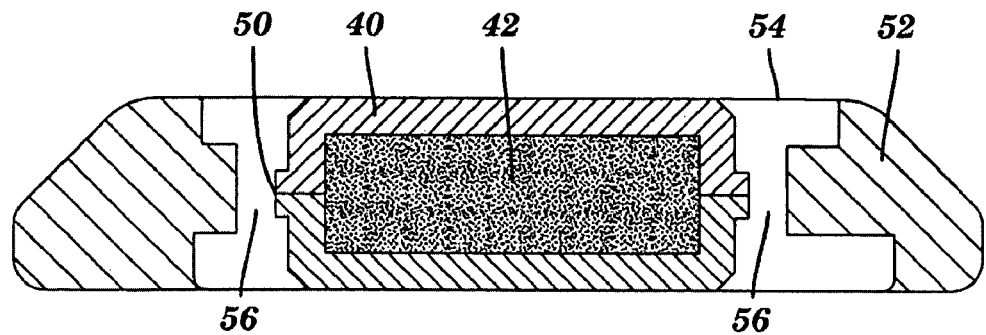
FIG. 7 is a cross-sectional view of an assembly of the encasing housing shown in FIG. 2 and the molding housing shown in FIG. 5.
Figure 8:
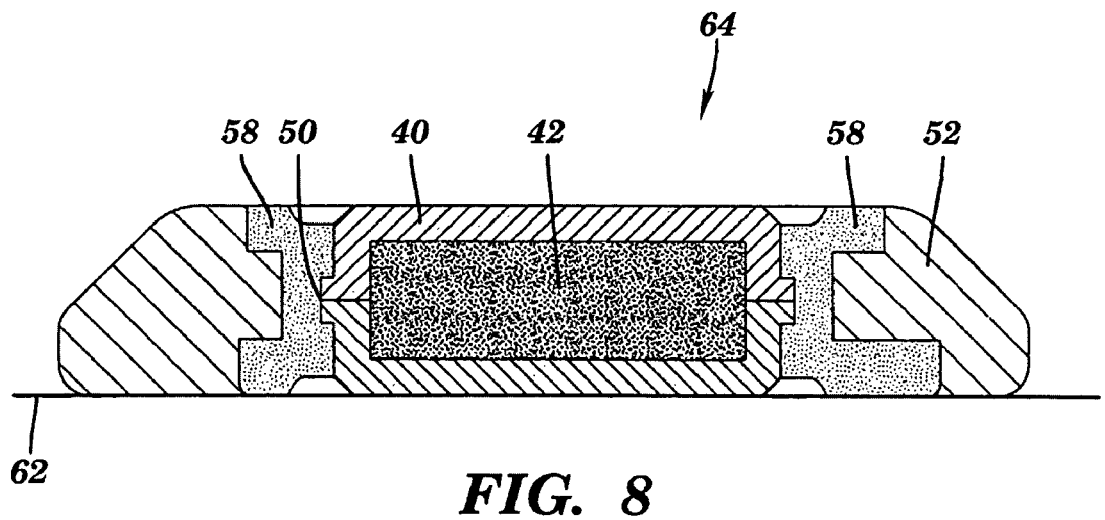
FIG. 8 is cross sectional view of the assembly shown in FIG. 7 with the addition of a hardenable fluid.

FIG. 7 is a cross-sectional view of the assembly of encasing housing 40 having magnet 42 shown in FIG. 2 into cavity 54 of mold housing 52 shown in FIGS. 5 and 6. As discussed above with respect to FIG. 1, cavity 54 in mold housing 52 may be sized wherein, when housing 40 is inserted into cavity 54, at least one void or passage 56 is provided that is in fluid communication with the at least one passage 50 in housing 40. As shown in FIG. 7, since housing 40 and mold housing 52 are circular cylindrical in shape, void or passage 56 comprises an annular void between the outside diameter of housing 40 and the inside diameter of mold housing 52. According to one aspect, a hardenable fluid may be introduced to passages 56 whereby at least some hardenable fluid can be introduced to passage 50 in housing 40. FIG. 8 is cross sectional view of the assembly shown in FIG. 7 with the addition of a hardenable fluid 58, such as epoxy or resin, to void 56. Hardenable fluid 58 may comprise any suitable thermoplastic material, for example, thermoplastic polymer, for instance, a polysulfone, a polypropylene, a polycarbonate, or a combination thereof. As a result, when the hardenable fluid 58 solidifies, at least some solidified fluid provides at least some obstruction to passages 50 to isolate magnet 42 from the environment.

As also discussed above with respect to FIG. 1, mold housing 52 shown in FIG. 8 may be provided with at least some means for retaining the hardenable fluid 58 in mold housing 52. For example, an open bottom of mold housing 52 may be placed against a surface 62 or mold housing 52 may include a bottom portion (not shown) adapted to retain the hardenable fluid 58.

Hardenable fluid 58 may be hardened by various means depending upon the nature of the hardenable fluid. For example, when hardenable fluid 58 comprises a polysulfone, hardenable fluid 58 may first be heated to a temperature above about 600 degrees F., for example, to a temperature between about 660 to about 680 degrees F. prior to introduction into a mold, such as mold housing 52, for example, by forced injection. The mold may typically be preheated to a temperature above 200 degrees F., for example, between about 250 degrees F. and about 320 degrees F., prior to injection. After injection, the assembly is allowed to cool prior to further handling, for example, cooled to ambient or room temperature. Depending upon the wall thickness of the resin, cooling may take at least about 20 seconds, for example, between about 30 seconds and about 60 seconds. In one aspect, hardenable fluid 58 may be force cooled by introducing a cooling medium to the assembly or immersing the assembly into a cooling medium.

Figure 9:
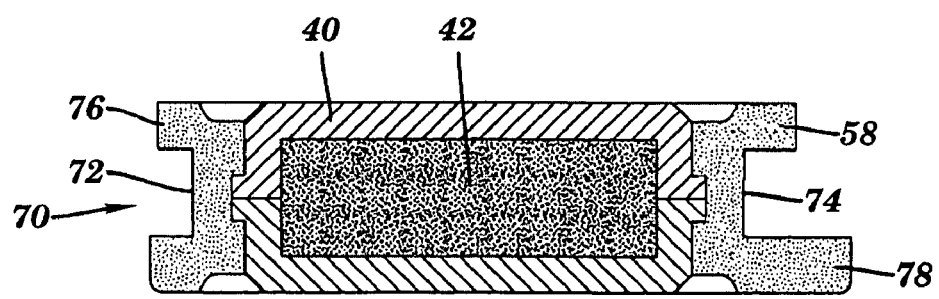
FIG. 9 is a cross section view similar to FIG. 8 with the mold housing removed.

After solidification or hardening of the hardenable fluid 58 and isolation of magnet 42 from its environment, an encased magnet assembly 64 having encasing housing 40, mold housing 52, and hardened fluid material 58 as shown in FIG. 8 may be provided. As discussed above with respect to FIG. 1, according to aspects of the invention, an encased magnet may be provided having mold housing 52 or having mold-housing 52 removed. One aspect of the invention in which mold housing 52 is removed is illustrated in FIG. 9. As shown in FIG. 9, an encased magnet assembly 70 may be provided comprising magnet 42 housed in encasing housing 40 and hardened hardenable fluid 58. According to the aspect of the invention shown in FIG. 9, encased magnet assembly 70 may comprise an over-mold component defined by the shape or geometry of hardenable material 58 as desired for the intended use of encased magnet assembly 70, for example, having the recesses 72, 74 and projections 76, 78 shown in FIG. 9. In other aspects, encased magnet assembly 70 shown in FIG. 9 may be further modified to provide the desired encased magnet shape, for example, at least one of projections 76, 78 may be removed, for example, by machining or grinding.

Figure 10:
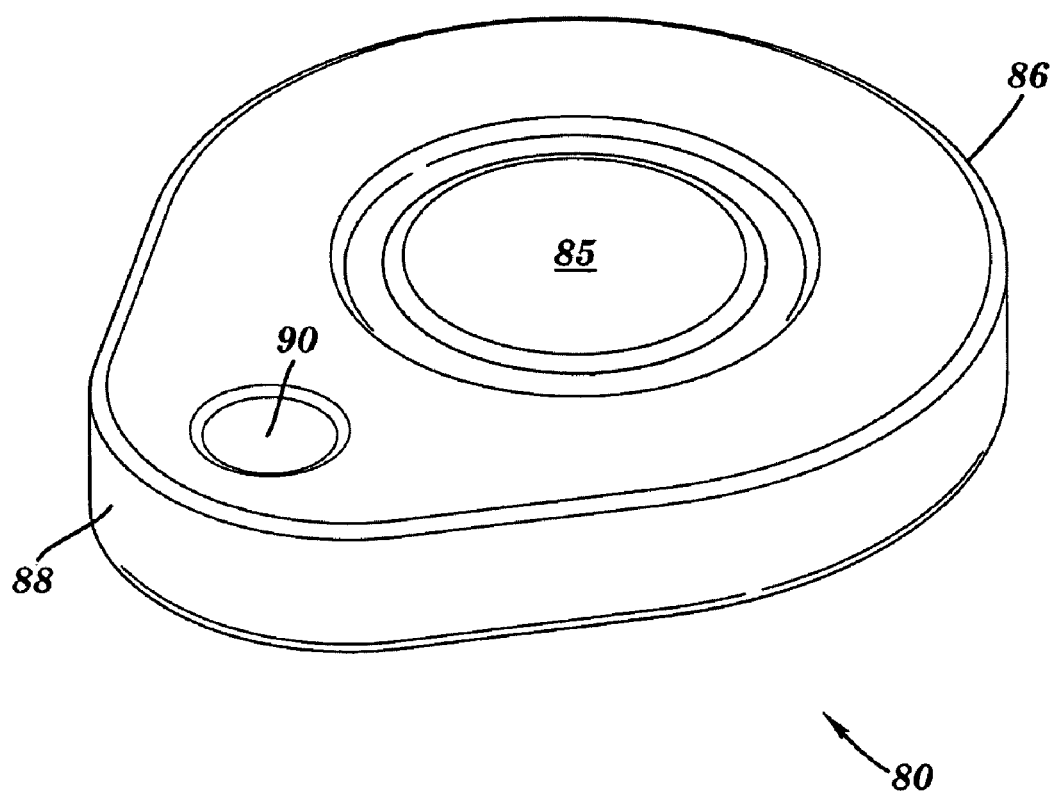
FIG. 10 is a perspective view of an encased magnet assembly according to another aspect of the invention.
Figure 11:
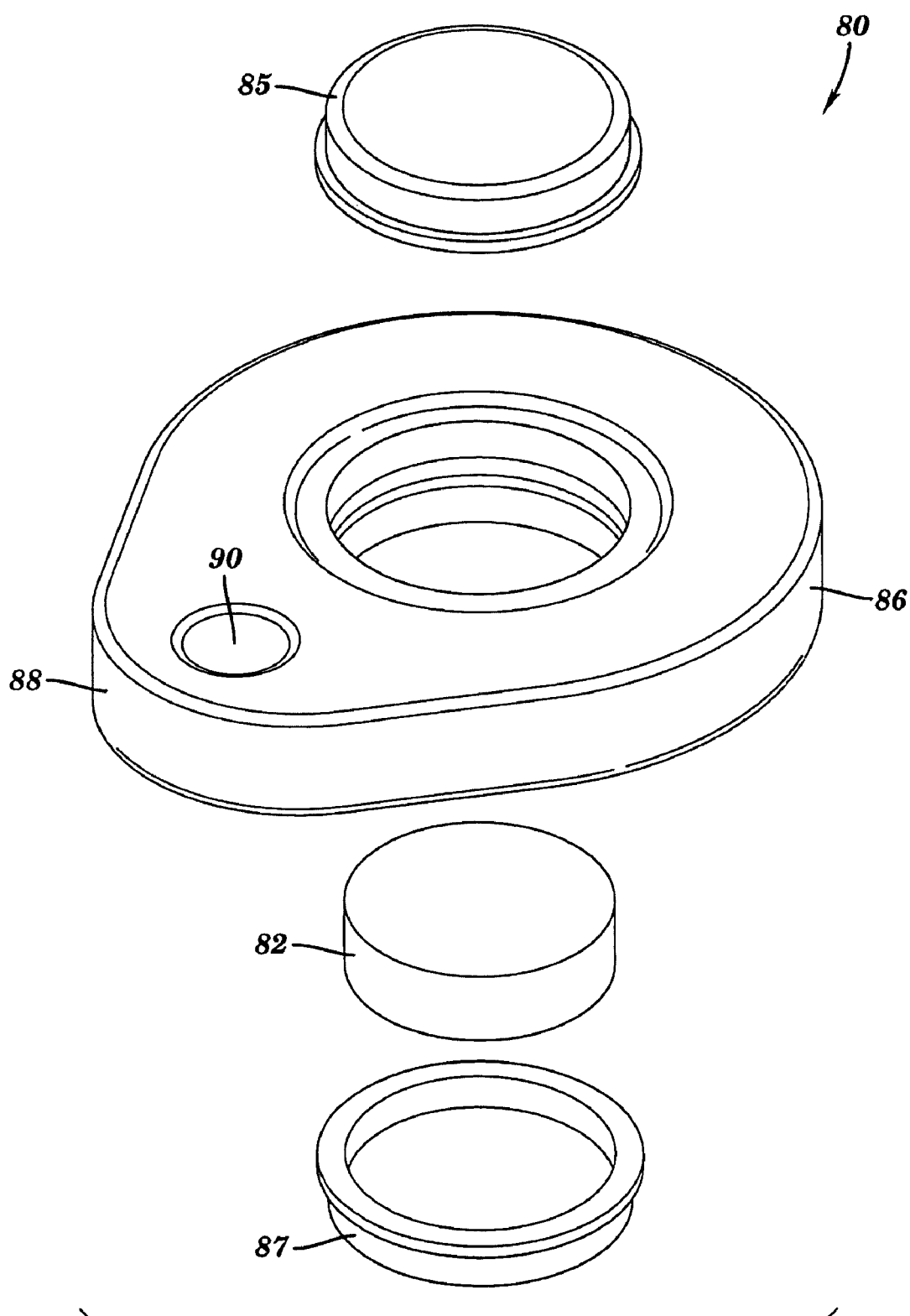
FIG. 11 is an exploded perspective view of an encased magnet assembly shown in FIG. 10.
Figure 12:
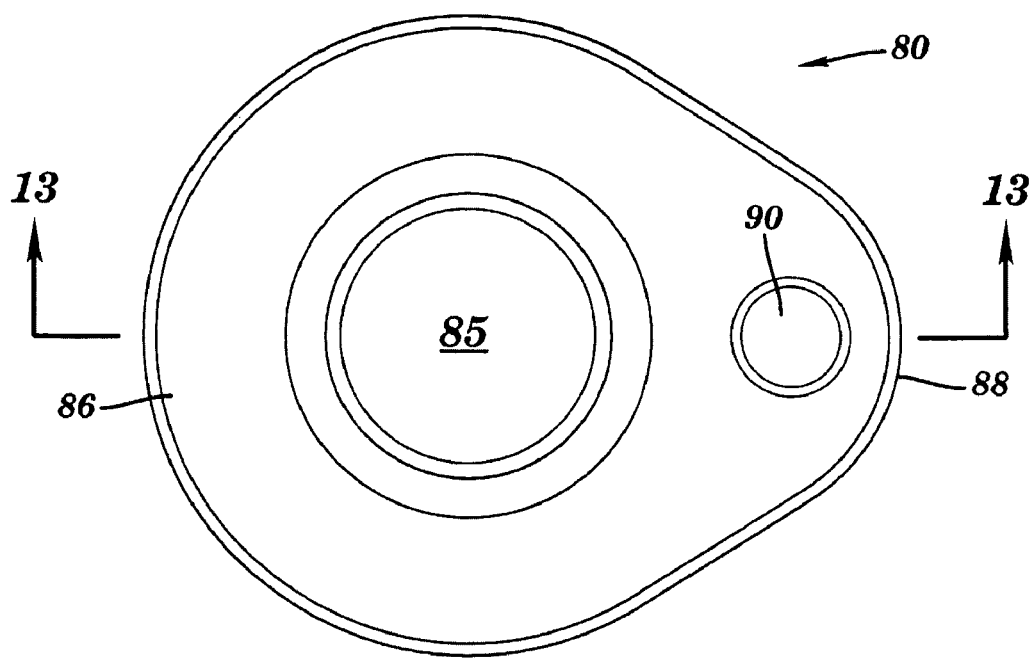
FIG. 12 is a top plan view of the encased magnet assembly shown in FIG. 10.
Figure 13:
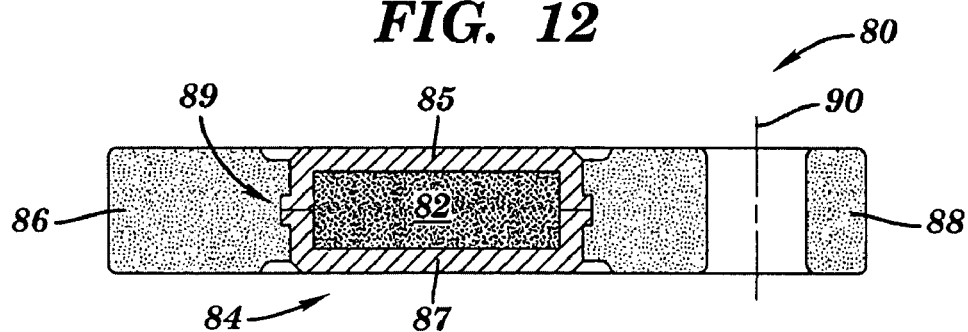
FIG. 13 is a cross sectional view of the encased magnet assembly shown in FIGS. 10 through 12 as viewed along section lines 13-13 in FIG. 12.
Figure 14:
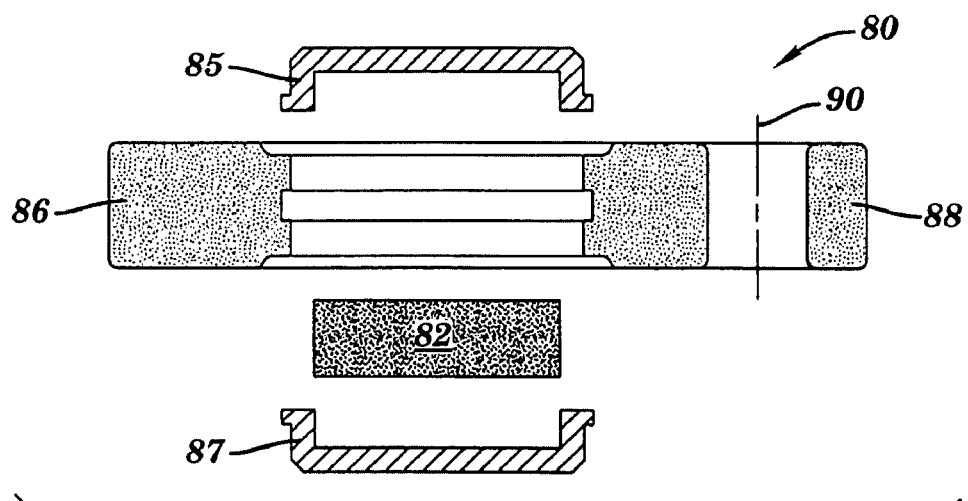
FIG. 14 is an exploded cross sectional view of the encased magnet assembly shown in FIG. 13.

FIG. 10 is a perspective view of an encased magnet assembly 80 according to another aspect of the invention. FIG. 11 is an exploded perspective view of encased magnet assembly 80 shown in FIG. 10. FIG. 12 is a top plan view of the encased magnet assembly 80 shown in FIG. 10. FIG. 13 is a cross sectional view of the encased magnet assembly 80 shown in FIG. 9 as viewed along section lines 13-13 in FIG. 12 and FIG. 14 is an exploded cross sectional view of the encased magnet assembly 80 shown in FIGS. 11 and 12. As shown, encased magnet assembly 80 includes a magnet 82, a magnet encasing housing 84 having a first or upper subassembly or cap 85 and a second or lower subassembly or cap 87, and a hardened encasing material or over-mold component 86, for example, an epoxy resin. Magnet 82 may be comprise a material similar to magnet 42 described above and magnet encasing housing 84 may comprise a material similar to encasing housing 40 described above. However, as shown in FIGS. 10 and 11, encasing material 86 may comprise any convenient size or shape depending upon the intended use of encased magnet assembly 80. For example, as shown in FIGS. 10 and 11, encasing material 86 may be provided by a generally circular cylindrical shape having a lobe 88 including a through hole 90. Through hole 90 may be chamfered as shown. When assembled, the mating surfaces of cap 85 and cap 87 define a least one passage 89 (see FIG. 13), for example, an annular passage, through which fluid may flow.

According to aspects of the invention, magnet 82 provided in encasing housing 84 may be positioned in a mold (not shown) having the desired shape for the over-mold component 86, for example, a circular or rectangular cylindrical shape, and the desired features, for example, one or more through holes 90, projections, or recesses as desired. The hardenable fluid, for example, a preheated fluid thermoplastic polymer, such as, a polysulfone, is then introduced to the mold, for example, by forced injection, and allowed to harden, for example, from a temperature of above about 600 degrees F. to a temperature below about 100 degrees F., to produce over-mold component 86. During the introduction of the hardenable fluid, at least some of the hardenable fluid obstructs at least some of the passage 89, for example, completely fills passage 89 whereby magnet 82 becomes substantially isolated from the outside environment. Again, depending upon the size of the assembly and the amount of hardenable fluid, cooling time may vary, but cooling may take at least about 20 seconds. After hardening of the hardenable fluid, the encased magnet assembly 80 shown in FIG. 10 may be removed from the mold (not shown) in which assembly 80 is positioned.

The encased magnet assemblies 34, 36, 38, 64, 70, or 80 may be used wherever it is desirable to use a magnet while isolating the magnet from its environment, for example, where the magnet may be harmful to the environment or the environment may be harmful to the magnet. Aspects of the invention may be used in liquid or gaseous environments, for example, an environment containing chlorine gas that may damage or otherwise interfere with the magnet. Magnet assemblies according to aspects of the invention may be employed in liquid environments, for example, in seawater, brine, or bodily fluids, where exposure to the liquid may damage the magnet. For example, aspects of the invention may be used in prosthetic surgery to retain, temporarily or substantially permanently, prosthetic devices, or their related hardware. One area where aspects of the invention may be used is in the field of medical prosthesis where the installation of the prosthesis may be facilitated by using magnetic shims. Aspects of the present invention may be used as shimming devices that can be magnetically retained on prosthetic equipment, and even retained within the body, without fear of contamination of the body by the magnetic shim or damage of the encased magnet by bodily fluids.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of an encasing a magnet to substantially isolate the magnet from a surrounding environment, the method comprising:
    inserting the magnet into a cavity in a housing, the housing comprising at least one passage capable of passing a fluid from the environment to the magnet;
    inserting the housing into a mold having a void wherein the at least one passage in the housing is in fluid communication with the void;
    introducing a hardenable fluid to the void of the housing wherein the hardenable fluid obstructs the at least one passage in the housing; and
    solidifying the hardenable fluid in at least a portion of the at least one passage in the housing to provide a solid obstruction to the at least one passage to substantially isolate the magnet from substantially all environmental fluids.

2. The method as recited in claim 1, wherein the housing comprises a circular housing and the void comprises an annular void about an outside diameter of the circular housing.

3. The method as recited in claim 1, wherein the housing comprises a first housing and a second housing and the at least one passage comprises a passage formed by mating surfaces of the first housing and the second housing.

4. The method as recited in claim 1, wherein the housing comprises a first material, and the hardenable fluid material comprises a second material bondable to the first material.

5. The method as recited in claim 4, wherein the second material comprises the first material.

6. The method as recited in claim 1, wherein promoting the solidification of the hardenable fluid comprises curing the hardenable fluid for a time at a temperature.

7. The method as recited in claim 1, wherein the hardenable fluid comprises a resin.

8. The method as recited in claim 7, wherein the resin comprises a synthetic resin.

9. The method as recited in claim 7, wherein the resin comprises at least one of polysulfone, polypropylene, and polycarbonate resin.

10. A method of an encasing a magnet to substantially isolate the magnet from a surrounding environment, the method comprising:
    inserting the magnet into a cavity in a housing comprising an upper housing, a lower housing, and at least one passage, the at least one passage capable of passing a fluid from outside the housing to the cavity;
    inserting the housing into a mold;
    injecting a flowable resin into the mold to obstruct the at least one passage with flowable resin; and
    promoting the solidification of the flowable resin in at least a portion of the at least one passage to provide a solid obstruction to the at least one passage and substantially isolate the magnet from any fluids from outside the housing.

11. The method as recited in claim 10, wherein the passage is formed by mating surfaces of the upper housing and lower housing.

12. The method as recited in claim 10, wherein the method provides a substantially fluid-tight seal between the magnet and the environment about the magnet.

13. The method as recited in claim 10, wherein the housing is fabricated from a first resin, and wherein injecting the flowable resin comprises injecting a flowable form of the first resin.

14. The method as recited in claim 10, wherein inserting the housing into the mold comprises inserting the housing into the mold and forming a void between the housing and the mold; and wherein injecting the flowable resin into the mold comprises injecting the flowable resin into the void.

15. The method as recited in claim 14, wherein forming the void comprises forming an annular void between the housing and the mold.

16. The method as recited in claim 15, wherein promoting the solidification of the flowable resin comprises promoting the formation of a solidified resin retaining ring in the annular void.

17. The method as recited in claim 1, wherein the method is practiced to encase the magnet in the housing.

18. The method as recited in claim 1, wherein the method is practiced to encase the magnet in the mold.

19. The method as recited in claim 10, wherein the method is practiced to encase the magnet in the housing.

20. The method as recited in claim 10, wherein the method is practiced to encase the magnet in the mold.

21. A method for fabricating a magnetic shim for use in surgical installation of a prosthesis, the method comprising:
    inserting a magnet into a cavity in a housing comprising an upper housing, a lower housing, and at least one passage, the at least one passage capable of passing a fluid from outside the housing to the cavity;
    inserting the housing into a mold, the mold defining a void between the housing and the mold and the mold defining a shape of the magnetic shim for use in surgical installation of the prosthesis;

injecting a flowable resin into the void between the housing and the mold to obstruct the at least one passage with flowable resin and at least partially fill the void; and promoting the solidification of the flowable resin in at least a portion of the at least one passage to provide a solid obstruction to the at least one passage and promoting the solidification of the flowable resin in the void to provide the magnetic shim having the shape defined by the mold for use in surgical installation of the prosthesis.

22. The method as recited in claim 21, wherein the method comprises a method of fabricating a disk-shaped magnetic shim, wherein the cavity in the housing comprises a cylindrical cavity, and wherein the method provides the disk-shaped magnetic shim.

* * * * *